(12) United States Patent
Cokonaj

(10) Patent No.: US 10,858,120 B2
(45) Date of Patent: Dec. 8, 2020

(54) AIRCRAFT LANDING GEAR ASSEMBLY INCLUDING A HEALTH AND USAGE MONITORING SYSTEM (HUMS) AND METHOD

(71) Applicant: Safran Landing Systems UK Limited, Gloucester (GB)

(72) Inventor: Valerijan Cokonaj, Gloucester (GB)

(73) Assignee: Safran Landing Systems UK LTD

( * ) Notice: Subject to any disclaimer, the term of this patent is extended or adjusted under 35 U.S.C. 154(b) by 357 days.

(21) Appl. No.: 15/297,723

(22) Filed: Oct. 19, 2016

(65) Prior Publication Data
US 2017/0113811 A1    Apr. 27, 2017

(30) Foreign Application Priority Data
Oct. 23, 2015    (EP) .................................... 15191342

(51) Int. Cl.
| | | |
|---|---|---|
| *B64D 45/00* | (2006.01) | |
| *B64C 25/00* | (2006.01) | |
| *B64C 25/10* | (2006.01) | |
| *B64C 25/60* | (2006.01) | |

(52) U.S. Cl.
CPC .............. *B64D 45/00* (2013.01); *B64C 25/00* (2013.01); *B64C 25/10* (2013.01); *B64C 25/60* (2013.01); *B64D 2045/008* (2013.01); *B64D 2045/0085* (2013.01)

(58) Field of Classification Search
CPC ................ B64D 45/00; B64D 45/0005; B64D 2045/008; B64D 2045/0085; B64C 25/00; B64C 25/10; B64C 25/60; G01L 17/005; G01L 5/0014; G01L 5/0071
See application file for complete search history.

(56) References Cited

U.S. PATENT DOCUMENTS

| | | | | |
|---|---|---|---|---|
| 4,569,600 A | * | 2/1986 | Preniczny | ............... F16D 55/40 188/1.11 E |
| 4,651,402 A | | 3/1987 | Bonfils | |
| 5,186,042 A | | 2/1993 | Miyazaki | |
| 7,683,274 B2 | | 3/2010 | Dellac | |
| 8,286,508 B2 | * | 10/2012 | Eriksen | ................... B64C 25/28 73/862.08 |
| 8,565,965 B2 | * | 10/2013 | Nance | ..................... B64C 25/60 177/141 |

(Continued)

FOREIGN PATENT DOCUMENTS

| | | |
|---|---|---|
| EP | 1726935 | 11/2006 |
| EP | 2441671 | 4/2012 |

(Continued)

OTHER PUBLICATIONS

European Search Report for European Application No. 15191342.3-1754, dated Apr. 8, 2016, 8 pages.

*Primary Examiner* — Medhat Badawi
*Assistant Examiner* — Vicente Rodriguez
(74) *Attorney, Agent, or Firm* — RatnerPrestia

(57) ABSTRACT

A health and monitoring system or "HUMS" mounted within a hollow structural subassembly of an aircraft landing gear assembly, the subassembly having an access port for access to the HUMS without requiring disassembly of the structural subassembly so as to require jacking up the aircraft.

18 Claims, 3 Drawing Sheets

(56) References Cited

U.S. PATENT DOCUMENTS

| | | | |
|---|---|---|---|
| 2004/0075022 A1* | 4/2004 | MacKness | B60C 23/0408 244/100 R |
| 2008/0114506 A1* | 5/2008 | Davis | G05B 23/024 701/16 |
| 2010/0257946 A1* | 10/2010 | Inns | B64C 25/00 73/862.57 |
| 2011/0214601 A1* | 9/2011 | Martin | B64C 25/001 116/203 |
| 2012/0043471 A1* | 2/2012 | Harpring | G01T 7/00 250/394 |
| 2012/0053784 A1* | 3/2012 | Schmidt | G01G 19/07 701/33.4 |
| 2012/0095622 A1* | 4/2012 | Lynch | B64C 25/00 701/3 |
| 2015/0034762 A1 | 2/2015 | Reber | |
| 2015/0247770 A1* | 9/2015 | Nance | G01L 5/16 701/16 |
| 2015/0316438 A1* | 11/2015 | Nance | G01M 1/125 701/3 |

FOREIGN PATENT DOCUMENTS

| | | |
|---|---|---|
| FR | 2545170 | 11/1984 |
| GB | 1338589 | 11/1973 |
| WO | 2005022098 | 3/2005 |
| WO | 2006041513 | 4/2006 |

\* cited by examiner

AIRCRAFT LANDING GEAR ASSEMBLY INCLUDING A HEALTH AND USAGE MONITORING SYSTEM (HUMS) AND METHOD

This application claims the benefit of and priority to European Application 15191342.3, filed Oct. 23, 2015, the contents of which are incorporated herein by reference.

BACKGROUND OF THE INVENTION

It is known to provide an aircraft with a health and usage monitoring system (HUMS). A HUMS can include one or more sensors arranged to monitor parts of the aircraft to determine for example whether the parts have been subjected to mechanical loads exceeding a predetermined acceptable limit.

One type of HUMS is known as an integrated vehicle health monitoring system (IVHMS), also known as an aircraft condition monitoring system (ACMS). An IVHMS is an integral part of an aircraft which is installed at the point of aircraft manufacture.

It is also known to provide a HUMS upgrade which can be retrofitted to an in-service aircraft by interfacing the HUMS with the aircraft's IVHMS and/or avionics system.

The present inventor has identified that HUMS can be improved in terms of one or more of the following aspects:
  complexity;
  weight;
  degree of interference with aircraft systems; the amount of aero acoustic noise thy generate in use; and
  suitability for retrofitting to in-service aircraft.

SUMMARY OF THE INVENTION

Embodiments of the invention relate to a health and monitoring system or "HUMS" mounted within a hollow structural subassembly of an aircraft landing gear assembly, the subassembly having an access port for access to the HUMS without requiring disassembly of the structural subassembly so as to remove or adversely affect its intended load bearing capability.

According to a first aspect of the present invention, there is provided an aircraft landing gear assembly for supporting an aircraft, the landing gear assembly is supporting the aircraft and is in contact with the ground; and
  a first structural subassembly which defines a cavity and an access port for providing access to the cavity from the exterior of the first subassembly while, in use, the landing gear assembly is supporting the aircraft and is in contact with the ground; and
  one or more HUMS components removably coupled to the first structural subassembly within the cavity.

Thus, the landing gear assembly according to the first aspect of the invention includes HUMS components housed within a cavity defined by a structural subassembly of the landing gear assembly. The structural subassembly also defines an opening or port which can be used by a maintenance engineer to access the cavity while the aircraft is stationary with weight on wheels. The access port can be closed by a removable cover so that during flight the port is substantially closed, although the cavity can be exposed to ambient conditions. The structural subassembly can serve as a protective casing for the HUMS to protect it from foreign object damage, avoiding the need for a dedicated casing. The structural subassembly can also substantially isolate the HUMS from incident airflow, which could lead to aero- acoustic noise if the HUMS components were mounted externally on the landing gear assembly. The landing gear assembly according to the first aspect can enable HUMS components to be readily installed and replaced via the opening during maintenance operations as line replaceable units.

The access port can be arranged to be closed by a removable cover arranged such that in use the cover can be removed while the landing gear assembly is supporting the aircraft and is in contact with the ground. The cover can include one or more holes for enabling wires to pass from the HUMS device(s) within the cavity to the exterior face of the cover, which in turn can be provided with conventional data or power connectors.

The first subassembly can comprise metal, such as aluminium, steel, titanium or a suitable alloy. In such embodiments, the metal chamber walls can provide an electromagnetic interference (EMI) shield around the HUMS components, so as to shield other electronic aircraft systems from EMI generated by the HUMS components. This can lead to a landing gear assembly of reduced weight in view of the fact that it is not a requirement to provide a dedicated EMI shield.

The one or more HUMS components can comprise a plurality of HUMS components including a power supply, a printed circuit board including a data processor, a memory, a data acquisition module and one or more sensors. In such embodiments, the HUMS can be a self-contained system within the cavity, with no requirement for external connections to other aircraft systems in order to perform health and usage monitoring of the landing gear assembly.

The one or more HUMS components can be removably coupled to the subassembly by a mechanical clip, fitting or fixing.

The access port can be sized to be accessible by an average adult human hand. For example, the access port can have a minimum width or diameter of 70 mm. A tool such as a pair of tongs or snipe nosed pliers can be used to access smaller ports or cavities.

The landing gear assembly can include one or more further structural subassemblies which each defines a further cavity and access port and includes one or more HUMS components mechanically coupled to the further structural subassembly within the cavity.

The structural subassemblies can each comprise one of: a main fitting, a bogie beam and an axle.

The landing gear assembly can be a main landing gear assembly or a nose landing gear assembly, a central landing gear, or any other type of landing gear.

In accordance with a second aspect of the invention, there is provided an aircraft including one or more landing gear assemblies according to the first aspect.

In accordance with a third aspect of the invention, there is provided a method of fitting a HUMS to an aircraft landing gear assembly comprising the steps of:
  placing one or more HUMS components within a cavity within a first structural subassembly of the aircraft landing gear assembly via an access port devined by the first structural subassembly; and
  removably coupling the one or more HUMS components to the first subassembly within the cavity.

Thus, the method according to the third aspect enables a landing gear assembly to be fitted with an HUMS at the point of manufacture, or retrofitted with an HUMS during a maintenance operation or during routine check operations.

The method can include a step of closing the access port with a removable cover following the step of mechanically coupling the one or more HUMS components to the first subassembly within the cavity.

The method can include a step of removing a HUMS component from the cavity via the access port prior to the step of placing one or more HUMS components within the cavity, at least one of the one or more HUMS components being equivalent to the removed HUMS component. Thus, the method of this embodiment enables replacement of HUMS components during a maintenance operation.

These and other aspects of the present invention will become apparent from, and clarified with reference to, the embodiments described herein.

BRIEF DESCRIPTION OF THE DRAWINGS

Embodiments of the present invention will now be described, by way of example only, with reference to the accompanying drawings, in which.

SPECIFICATION DESCRIPTION OF EMBODIMENTS OF THE INVENTION

Figure 1:
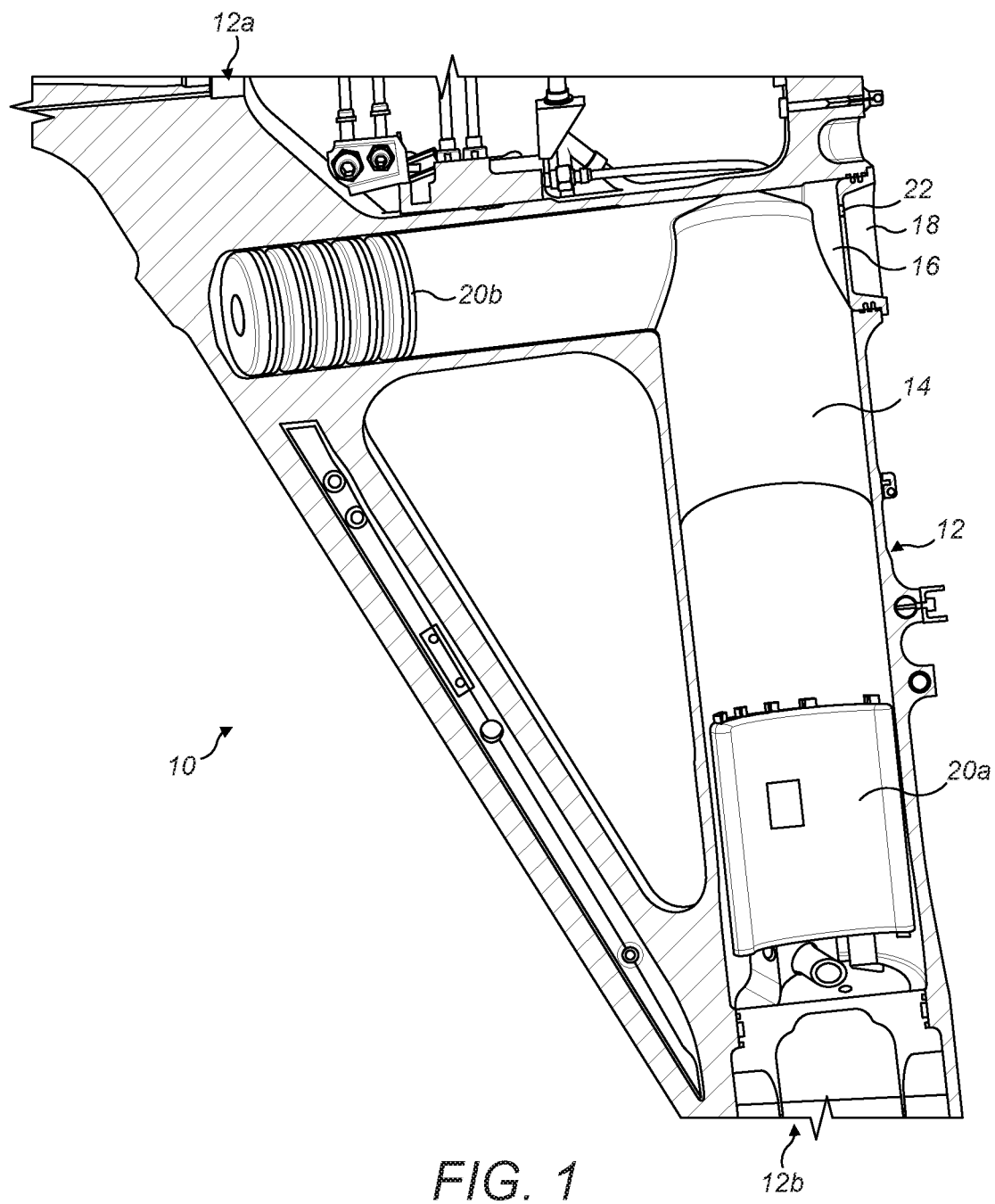
FIG. 1 shows a partial view of an aircraft landing gear assembly according to embodiments of the invention.

FIG. 1 shows an aircraft landing gear assembly 10 according to embodiment of the invention.

The landing gear assembly 10 includes a first structural subassembly, namely a main fitting 12 of a main shock absorbing strut. As will be appreciated, the main fitting 12 is intended to be movably coupled to an aircraft (not shown) such that the landing gear assembly 10 can be moved between a deployed condition for take-off and landing, and stowed condition for flight. An upper portion 12a is arranged to be pivotally coupled to the airframe. A lower portion 12b includes or defines a telescopic shock absorber. However, in some embodiments the landing gear assembly can include a rigid strut which does not include shock absorbing means.

The main fitting 12 defines an internal space or cavity 14 at an upper region of it. The cavity 14 is generally cylindrical in cross section and arranged in an inverted 'L' shape, with a longitudinal portion in communication with a lateral portion. The lateral portion is known in the art as a 'torque tube' or 'upper chamber'. The main fitting 12 therefore includes chamber walls which define the cavity 14.

The main fitting 12 also defines an opening or port 16 through the chamber wall, which the present inventor has identified as being suitable for providing access to the cavity 14 from the exterior of the main fitting 12. In this embodiment the port 16 is axially aligned with the torque tube portion of the cavity 14. The port 16 is wide enough to enable a maintenance engineer to access the cavity 14 by hand. The port 16 can for example be 100 mm in diameter.

The port 16 is provided with a removable cover 18, which in this embodiment is known as the 'upper chamber cover'. The upper chamber cover 18 is formed from a rubber or the like and is arranged to be retained within the port 16 by way of an interference fit to close the cavity. The cover 18 can be removed and replaced without affecting the normal load bearing function of the main fitting 12. Moreover, the cover 18 is easily accessible in that there is a sufficient amount of free space adjacent the cover, outside of the main fitting 12, to enable a maintenance engineer to remove the cover 18 and access the cavity 14 via the port 16 without disassembling parts of the landing gear assembly 10 or having to jack it up. The cover 18 can include one or more holes 22 (schematically illustrated in FIG. 1) for enabling wires to pass from the HUMS device(s) within the cavity 14 to the exterior face of the cover 18.

Many existing landing gear assemblies include structural subassemblies of this nature. The present inventor has realised that such cavities within such structural subassemblies can be advantageously utilised to house one or more HUMS components.

A plurality of HUMS components 20a, 20b are mechanically coupled to the main fitting 12 within the cavity 14. In the illustrated example, the HUMS components comprise a printed circuit board (PCB) 20a and a battery 20b, which can be rechargeable and arranged to be connected to the aircraft power supply by a wired connection while the aircraft is parked. The components 20a, 20b can be mounted within the cavity 14 by any suitable mechanical fixing, such that they can be attached to and removed from the main fitting 12 via the access port 16. The PCB can include various electronic components such as a data processor, memory, sensors, a data readout device, etc. The PCB 20a is electrically coupled to the battery 20b via wires (not shown).

Figure 2:
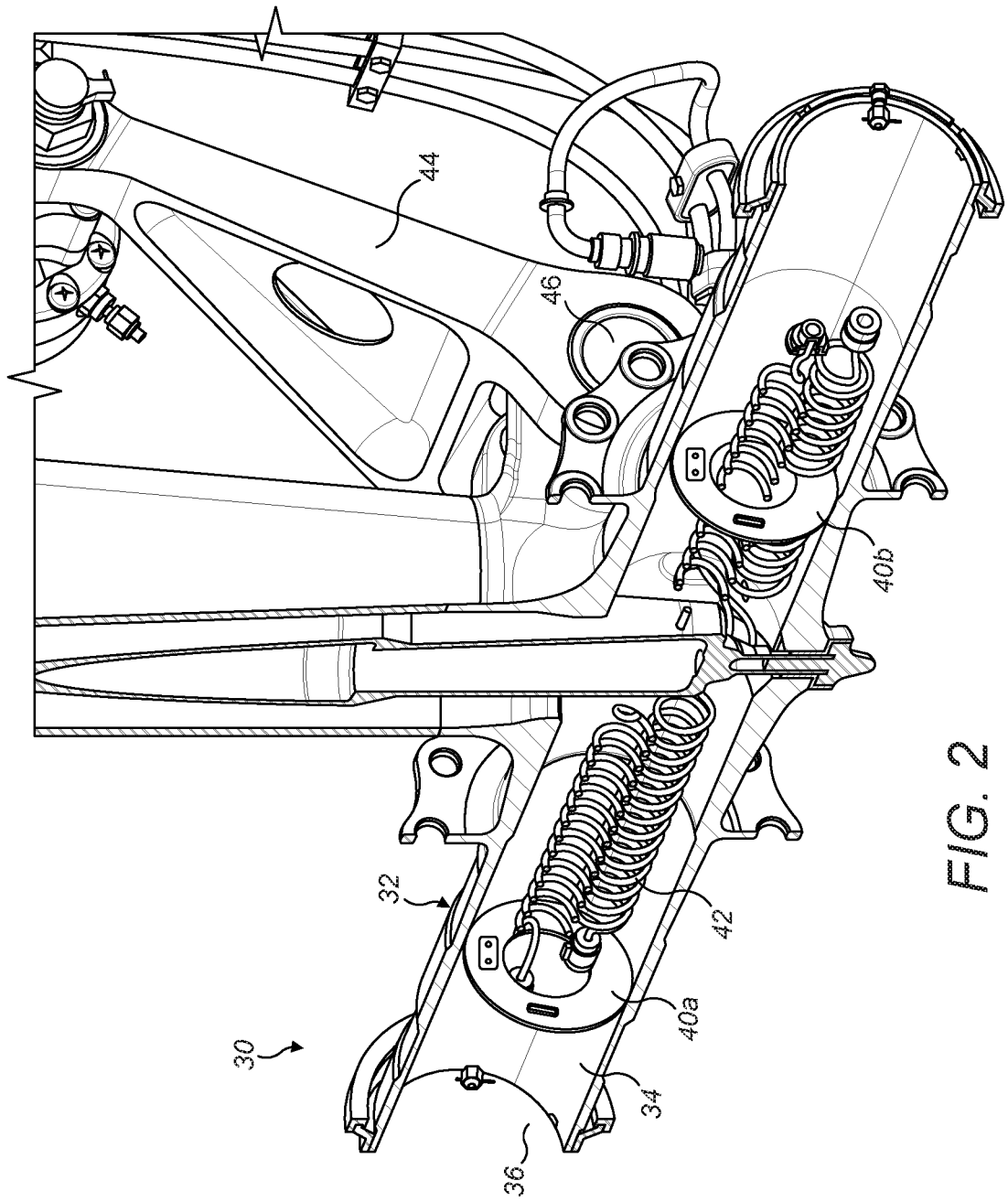
FIG. 2 shows a partial view of an aircraft landing gear assembly according to a further embodiment of the present invention.

FIG. 2 shows an aircraft landing gear assembly 30 according to a further embodiment of the invention.

In this embodiment, the first structural subassembly comprises an axle 32 that is attached to a link 44 by a pivot pin 46. The axle 32 defines a generally cylindrical cavity 34.

Access ports 36 at either end of the axle 32 enable access to the cavity 34 from the exterior of the axle 32. The ports 36 can have a diameter such as 70 mm.

The ports 36 are arranged to be closed by wheel covers (not shown), which are removably fitted.

HUMS components 40a, 40b are mounted within the cavity 34. Each HUMS component 40a, 40b is removably coupled to an inner surface of the axle 32 via any suitable mechanical means.

In the illustrated embodiment, the cavity contains other components which are non-HUMS components, such as wiring 42 connecting an integrated transducer to an external connection. In this embodiment, the HUMS components 40a, 40b are disc shaped PCBs with hollow centres sized to accommodate the non-HUMS components. However, in other embodiments HUMS components can be shaped and/or orientated in any suitable manner so as not to interfere with non-HUMS components within a cavity.

Figure 3:
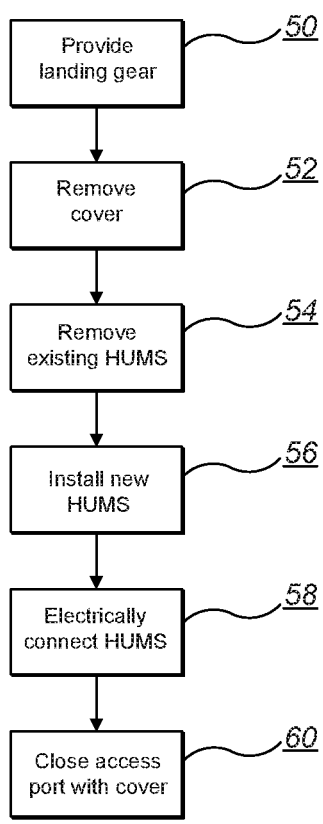
FIG. 3 is a flow chart illustrating a method according to embodiment of the invention.

FIG. 3 illustrates a method of producing a landing gear assembly according to an embodiment of the invention.

At step 50 an aircraft landing gear assembly is optionally provided. This can be an existing aircraft landing Dear assembly which has not been manufactured with an HUMS system, or can be new aircraft landing gear assembly which is in the process of being manufactured for the first time and is intended to be fitted with a HUMS system as described herein. Alternatively, the landing gear assembly can be a landing gear assembly provided with an HUMS as described herein, a component of which requires replacement.

At step 52, the method can include an optional step of a removing a cover which covers the access port.

At step 54 the method includes an optional step of removing an existing an HUMS component from the cavity.

At step 56 the method includes introducing one or more HUMS components into the cavity via the access port and removably coupling the one or more HUMS components to the first structural subassembly within the cavity. Where the method includes an earlier step of removing an existing component, this step can include replacing the removed component with an equivalent new component.

At step 58 the method includes an optional step of electrically connecting a plurality of HUMS components within the cavity by wiring which is contained within the cavity.

At step 60 the method includes an optional step of closing the access port with the removable cover.

Thus, embodiments of the invention enable an aircraft landing gear assembly to be provided with a HUMS which can be simpler and lighter than known HUMS. Advantageously, the HUMS components can be fitted within, and removed from, the cavity without adversely affecting the normal load bearing function of the structural subassembly and without requiring significant disassembly of the component, thereby enabling the HUMS to be fitted to the landing gear assembly and maintained in a simple and timely manner, resulting in a HUMS which can be described as a line replaceable unit.

A complete HUMS can be contained within one cavity or a plurality of intercommunicated cavities within the landing gear assembly.

As used herein the term 'structural subassembly' is intended to cover an assembly which has a load bearing function when the landing gear assembly is loaded by the aircraft. As such, the first subassembly can comprise an aircraft main fitting, a bogie beam or an axle, each of which can include one or more cavities suitable for receiving HUMS components, each cavity being accessible by an access port.

Embodiments of the invention can include a plurality of structural subassemblies each of which includes cavities containing HUMS components as described above.

Structural subassemblies can be formed of any suitable material. In embodiments where a cavity defining structural subassembly is formed of metal, for example, titanium alloy, aluminium alloy or steel, then the structural subassembly can serve as an EMI shield around the HUMS components within the cavity.

In all embodiments, a cavity defining structural subassembly can serve as a mechanical cover to shield the HUMS components from foreign object damage in use. Thus, all embodiments can provide a HUMS of reduced weight because there is no requirement for the HUMS components to be provided with a dedicated casing. Also, because the components are enclosed within the cavity, there is a reduced likelihood of the HUMS components generating aero-acoustic noise when the landing gear is deployed.

The HUMS components can be removably coupled to the landing gear structural subassembly by any suitable means, such as via a bracket which is bonded to an internal chamber wall and which includes a clip arranged to engage the HUMS component to hold it in place within the cavity.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parenthesis shall not be construed as limiting the claims. The word "comprising" does not exclude the presence of elements or steps other than those listed in any claim or the specification as a whole. The singular reference of an element does not exclude the plural reference of such elements and vice-versa. Parts of the invention may be implemented by means of hardware comprising several distinct elements, or by a suitably programmed computer. In a device claim enumerating several parts, several of these parts may be embodied by one and the same item of hardware. The mere fact that certain measures are recited in mutually different dependent claims does not indicate that a combination of these measures cannot be used to advantage.

The invention claimed is:

1. An aircraft landing gear assembly for supporting an aircraft, the landing gear assembly comprising:
   a first structural subassembly which defines a cavity and an access port for providing access to the cavity from the exterior of the first subassembly while, in use, the landing gear assembly is supporting the aircraft on the ground; and
   a plurality of health and monitoring system (HUMS) components removably coupled to the first structural subassembly, the plurality of HUMS components being housed within the cavity;
   wherein the plurality of HUMS components includes a power supply, a printed circuit board including a data processor, a memory, a data readout device and one or more sensors.

2. The aircraft landing gear assembly according to claim 1, wherein the access port is closed by a removable cover arranged such that, in use, the cover is removable while the landing gear assembly is supporting the aircraft on the ground.

3. The aircraft landing gear assembly according to claim 2, wherein the cover includes one or more holes arranged to facilitate a wired connection between the HUMS components and an exterior face of the cover.

4. The aircraft landing gear assembly according to claim 1, wherein the first subassembly comprises metal.

5. The aircraft landing gear assembly according to claim 1, wherein the one or more HUMS components are removably coupled to the component by a mechanical fitting or fixing.

6. The aircraft landing gear assembly according to claim 1, wherein the access port has a minimum diameter of 70 millimeters.

7. The aircraft landing gear assembly according to claim 1, wherein the landing gear assembly includes one or more further structural subassemblies which each defines a further cavity and access port and includes one or more HUMS components mechanically coupled to the further structural subassembly within the cavity.

8. The aircraft landing gear assembly according to claim 1, wherein the first structural subassembly comprises one of: a main fitting and an axle.

9. The aircraft landing gear assembly according to claim 1, wherein the landing gear assembly comprises a main landing gear assembly, a nose landing gear assembly, or a central landing gear.

10. An aircraft including one or more landing gear assemblies, the landing gear assembly comprising:
    a first structural subassembly which defines a cavity and an access port for providing access to the cavity from the exterior of the first subassembly while, in use, the landing gear assembly is supporting the aircraft on the ground; and
    a plurality of health and monitoring system (HUMS) components removably coupled to the first structural subassembly, the plurality of HUMS components being housed within the cavity;
    wherein the plurality of HUMS components includes a power supply, a printed circuit board including a data processor, a memory, a data readout device and one or more sensors.

11. A method of fitting a HUMS to an aircraft landing gear assembly comprising the steps of:
- placing a plurality of HUMS components within a cavity within a first structural subassembly of the aircraft landing gear assembly via an access port defined by the first structural subassembly; and
- mechanically coupling the plurality of HUMS components to the first structural subassembly such that the plurality of HUMS components are housed within the cavity;
- wherein the plurality of HUMS components includes a power supply, a printed circuit board including a data processor, a memory, a data readout device and one or more sensors.

12. The method according to claim 11, include a step of closing the access port with a removable cover following the step of mechanically coupling the one or more HUMS components to the first structural subassembly within the cavity.

13. The method according to claim 11, including a step of removing an installed HUMS component from the cavity via the access port prior to the step of placing one or more HUMS components within the cavity, wherein at least one of the one or more HUMS components is equivalent to the removed HUMS component.

14. The method according to any of claim 11, including a step of connecting a HUMS component comprising a rechargeable battery mounted within the cavity to an aircraft power supply to recharge the battery while the aircraft is parked.

15. The aircraft landing gear assembly according to claim 1, wherein the HUMS components are housed entirely within the cavity, so as to be enclosed from an outside environment.

16. The aircraft landing gear assembly according to claim 1, wherein the HUMS components are mounted in a fixed position relative to the cavity by a mounting device.

17. The aircraft landing gear assembly according to claim 1, wherein the landing gear assembly further comprises a link and a pivot pin connecting the link to the first structural subassembly.

18. The method of claim 11, wherein the steps of:
- placing a plurality of HUMS components within a cavity within a first structural subassembly of the aircraft landing gear assembly via an access port defined by the first structural subassembly; and
- mechanically coupling the plurality of HUMS components to the first structural subassembly such that the plurality of HUMS components are housed within the cavity,
- are performed while the first structural subassembly is reacting load applied to it by an aircraft while the aircraft landing gear assembly is supporting the weight of the aircraft on the ground.

* * * * *